May 13, 1930.　　　L. C. BRADLEY　　　1,758,141
COIN FREED WEIGHING APPARATUS
Filed Oct. 6, 1927　　　2 Sheets-Sheet 1
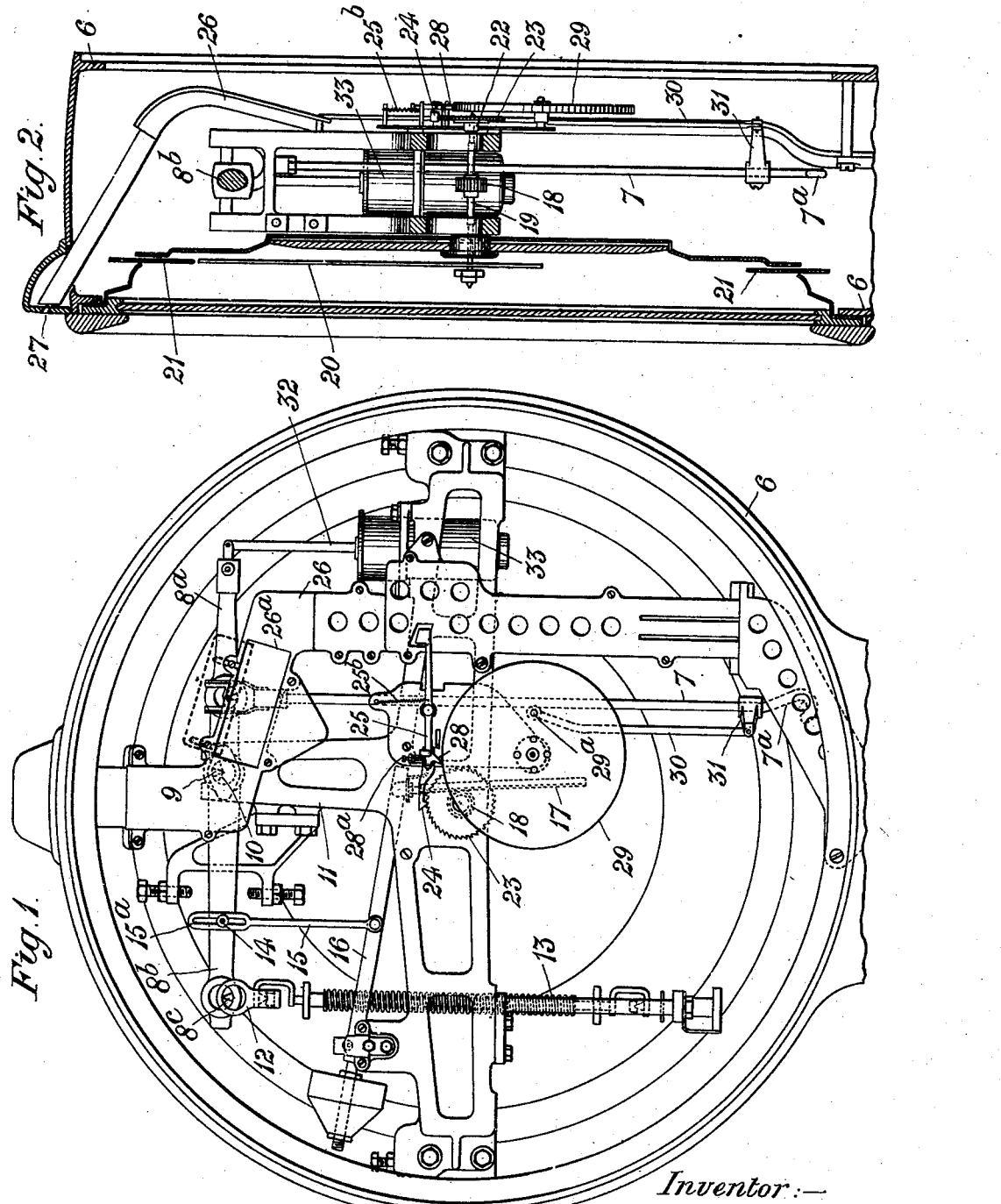
Inventor:—
Leslie C. Bradley
by George E. Folkes
his Attorney May 13, 1930.　　　　　L. C. BRADLEY　　　　　1,758,141
COIN FREED WEIGHING APPARATUS
Filed Oct. 6, 1927　　　2 Sheets-Sheet 2
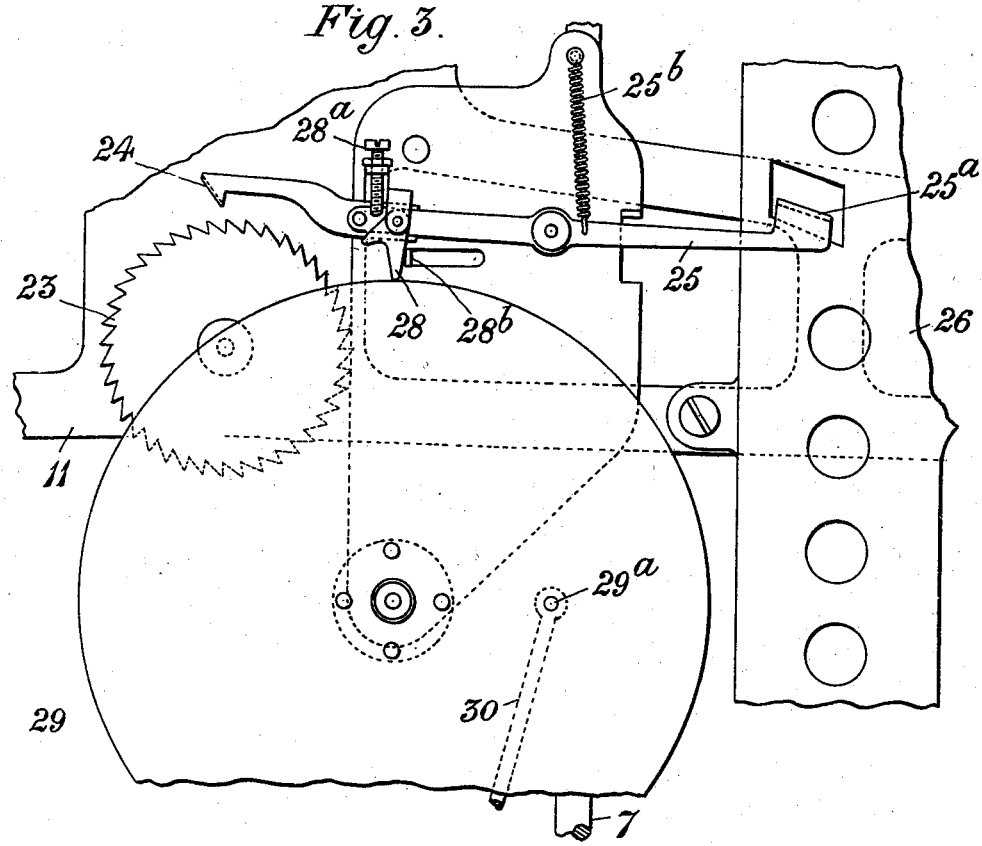
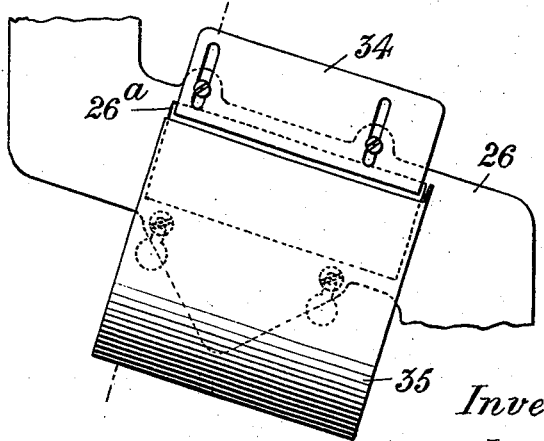
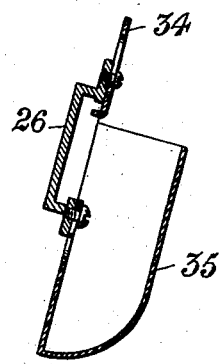
*Inventor:—*
*Leslie C. Bradley*
by George L. Folkes.
*his Attorney*

Patented May 13, 1930

1,758,141

UNITED STATES PATENT OFFICE

LESLIE CLIFFORD BRADLEY, OF BIRMINGHAM, ENGLAND, ASSIGNOR TO W. & T. AVERY LIMITED, SOHO FOUNDRY, OF BIRMINGHAM, ENGLAND

COIN-FREED WEIGHING APPARATUS

Application filed October 6, 1927, Serial No. 224,379, and in Great Britain December 18, 1926.

This invention has reference to improvements in or relating to coin freed weighing apparatus.

In connection with coin freed weighing apparatus it is found that the apparatus is particularly susceptible to fraudulent operation in that with suitable precautions it is possible to obtain the weighment of more than one person by the insertion of a single coin. Means have heretofore been devised for preventing fraudulent manipulation but such means as have been proposed previously have either been of a relatively intricate nature or have necessitated a positive connection with an operative part or parts of the weighing mechanism and, hence, have been objectionable on these grounds.

The present invention has for its object the provision of an improved coin freed weighing apparatus which is efficient in operation, simple in construction, and substantially fraud proof.

The invention consists of an improved coin freed weighing apparatus wherein the locking and unlocking of the indicating mechanism is governed by a trip lever adapted to be released by a coin said lever being provided with means which co-operate with a member controlled from an operative part of the weighing mechanism whereby subsequent to the release of the trip lever by a coin the indicating mechanism is only maintained in an unlocked position so long as there is a constant weight upon the weighing platform, any addition or reduction in the weight automatically returning the trip lever to a locking position, the aforesaid means preferably comprising a depending freely pivoted pawl the nose whereof is adapted to rest on the periphery of a rotatable disc connected with and adapted to be actuated from an operative part of the weighing mechanism said pawl being of such a length that when in the vertical position the locking means is maintained in its out-of-action position. The invention also resides in the provision of means for preventing the operation of the machine other than by coins of the specified denomination.

The invention will now be described with particular reference to the accompanying sheet of drawings, wherein:—

Figure 1 is a rear elevation of sufficient of the mechanism of a coin freed weighing apparatus constructed in accordance with the invention as is necessary to an understanding of the invention and showing the means for locking the indicating mechanism in the locking position, parts of the weighing apparatus being omitted, where desirable, for the sake of clearness.

Figure 2 is a part sectional and elevation of the portion of the coin freed weighing apparatus seen in Figure 1.

Figure 3 is a detail view, to an enlarged scale, of the means of locking the indicating mechanism, the said means being shown in the unlocked position.

Figure 4 is a detail view, to an enlarged scale, of the device for rejecting coins smaller in size than the coin specified for use with the apparatus, and Figure 5 is a vertical section of the coin rejection device seen in Figure 4.

A weighing platform is supported in known manner on a lever system which is adapted for connection through a draw-rod to the indicating mechanism, said rod being located within a hollow vertical pillar connecting the base portion of the weighing machine and a circular housing 6 within which the indicating mechanism and the mechanism to be hereinafter described is located. The upper end of the draw rod has connection with a hook $7^a$ formed at the lower end of a connecting rod 7 which is pivotally mounted at its upper end on knife-edges secured intermediate the ends of one arm $8^a$ of a lever which is fulcrumed on knife-edges 9 supported in bearings 10 carried by a bracket 11 fixed to the peripheral rim of the housing 6. Depending from knife-edges $8^c$ secured adjacent the end of the other arm $8^b$ of said lever is a shackle 12 which has connection with a coil spring resistant 13 the other end whereof is anchored to the housing. Adjacent its point of connection to the spring the lever is provided with an outwardly projecting pin 14 which engages and works within an elongated slot $15^a$ formed in the upper end of a substantially vertically disposed link 15 the other end whereof is pivotally connected to an arm of an overweighted lever 16 the inner end whereof is pivotally connected to a bracket carrying a rack 17. This rack meshes with a pinion 18 fixed intermediate the ends of a spindle 19 rotatably mounted in bearings carried by a bracket secured to the housing, said spindle 19 having fixed to the outer end thereof an indicating pointer 20 which registers with a graduated circular dial 21 in known manner.

Adjustably secured to a bush 22 attached to the rear end of the spindle 19 is a one-way ratchet wheel 23 (see Figure 3) adapted to co-operate with a detent 24 which is pivotally mounted in jaws formed at one end of a trip lever 25 fulcrumed on the bracket the other end of the said lever being provided with a projecting ledge 25$^a$ disposed within a coin chute 26 and in the path of a coin during its passage from a coin slot 27 to a collecting receptacle. Pivotally attached to the trip lever 25 adjacent the jawed end thereof and depending therefrom is a pawl-like member 28 the nose whereof is adapted to contact with the smooth periphery of a circular disc 29 rotatably mounted in bearings carried from the supporting bracket. Projecting from the rear face of the disc is a pin which serves as a pivot for the upper end of a rod 30 the lower end whereof is attached to a yoke 31 which in turn is fixed to the connecting rod 7. A light spring 25$^b$ anchored to the bracket 11 and to the trip lever normally tends to maintain the detent 24 in engagement with the ratchet wheel 23.

The pawl-like member 28 co-operates with stops 28$^a$ 28$^b$ respectively which limit the motion remitted to the said member.

The outer end of the arm 8$^a$ of the main lever has pivotal connection to the piston rod 32 of a dashpot 33 of known construction.

The coin slot 27 is formed in front of the housing and communicates with the coin chute 26 which directs the coin on to the projecting ledge 25$^a$ on the trip lever 25 and subsequently to the collecting receptacle. The coin slot 27 is made of such a size that only coins of the same or of a lesser diameter than the specified coin can be inserted in the slot. The coin chute 26 is provided in its length with a cut-away section 26$^a$ which co-operates with a slidable plate 34 having a pin and slot connection with the said chute whereby the plate can be adjusted so that the depth of the coin chute at the cut-away portion can be made to conform with a tolerance limit exactly to the diameter of the coin specified for use with the machine. At the said cut-away portion 26$^a$ the coin chute 26 is inclined outwardly (see Figure 4) whereby coins smaller than the specified coin are automatically discharged through the cut-away section 26$^a$ and allowed to fall into a receiving receptacle 35 supported from the said chute without contacting with the trip lever 25.

The main lever is preferably provided with a projection (not shown) which engages within the coin chute and prevents the coin passing completely down the said chute until the weighing platform is under load.

The operation of the device is as follows:—

Upon the application of a load to the weighing platform the pull of the load is transferred through the draw-rod and connecting rod 7 to the main lever and thence to the spring resistant 13 which is extended an amount according to the load. The motion of the main lever effects a displacement of the pin 14 within the slot 15$^a$ and thereby determines the degree of upward movement permitted to the overweighted lever 16 upon the release of the indicating mechanism as the said lever can only move in an upward direction until the bottom of the slot 15$^a$ comes into contact with the stop pin 14. The movement of the lever 16 through the rack 17 carried thereby and the pinion 18 effects the rotation of the indicating pointer 20. Upon the insertion of a coin the coin travels along the coin chute 26 and as the placing of the weighing platform under load has removed the projection in the lever from within the coin chute 26 the coin passes completely through the coin chute 26 and falls on to the projecting ledge 25$^a$ on the outer arm of the trip lever 25 thereby depressing the said arm and raising the inner arm upwardly whereby the detent 24 is removed from engagement with the ratchet wheel 23. The raising of the inner arm of the trip lever 25 allows the pawl-like member 28 to pivot and depend in a vertical position (see Figure 3) and upon the ejection of the coin into the collecting receptacle (not shewn) the nose of the said pawl-like member 28 impinges and rests on the smooth periphery of the rotatable disc 29 and prevents the downward motion of the outer arm of the trip lever thereby preventing the re-engagement of the detent 24 with the ratchet wheel 23 and permitting of the rotation of the indicating pointer and the completion of the weighing operation. When this has been effected any attempt to alter the weight on the weighing platform results in a motion of the connecting rod 7 and hence of the yoke 31 and arm 30 connected thereto any movement of the arm 30 being communicated to and effecting a rotation of the circular disc 29. The rotation of this disc 29 in either direction carries the nose of the pawl-like member 28 with it in the direction of rotation. The support of the inner arm of the trip lever 25 is thus removed and the said arm falls and allows the detent 24 to re-engage with the ratchet wheel 23 thereby locking the indicating pointer 20.

Upon the removal of all the load from the platform the indicating pointer is returned to zero position under the action of the spring resistant 13, the detent 24 and ratchet 23 permitting the requisite one-way rotation.

It will be appreciated that a weighing apparatus constructed as hereinbefore described ensures that only one weighment can be effected for each insertion of a coin and by reason of the trip mechanism being entirely separate from the weighing mechanism the apparatus can be employed with coins of all denominations with a specified maximum diameter without necessitating any separate balancing or other operation, the only adjustment necessary being that of the movable plate 34 relatively to the chute whereby it is ensured that the apparatus can only be actuated by coins of the absolute dimensions of the specified coin.

Claims:—

1. A coin freed weighing apparatus comprising a load supporting means, an automatic weight indicating mechanism connected with said load supporting means, a rotatable weight indicator forming part of said mechanism, a ratchet wheel rotatable with but fixed relatively to said indicator, a trip lever, a detent carried at one end of said trip lever and adapted to co-operate with said ratchet wheel for normally locking the aforesaid indicator, means for directing a coin on to the other end of the trip lever for freeing the detent from the ratchet wheel, a rotatable disc, a pawl depending from and pivotally connected to said trip lever, the nose of said pawl subsequent to the disengagement of the detent from the ratchet wheel, being adapted to rest on the peripheral edge of said disc and thereby to maintain the detent out of engagement with the ratchet wheel and means for connecting the rotatable disc to the weighing mechanism whereby any change of load when the detent is disengaged effects through the said disc a displacement of the pawl with the consequential return of the detent into its locking position.

2. A coin freed weighing apparatus comprising a load supporting means, a weighing resistant connected with said means, a rotatable weight indicator, means for effecting the rotation of said indicator, a lost motion linkage connecting said resistant to said last mentioned means, a ratchet wheel rotatable with but fixed relatively to said indicator, a trip lever, a detent carried at one end of said trip lever and adapted to co-operate with said ratchet wheel for normally locking the aforesaid indicator, means for directing a coin on to the other end of the trip lever for freeing the detent from the ratchet wheel and permitting a rotation of the indicator, a rotatable disc having a smooth peripheral edge, a pawl depending from and pivotally connected to said trip lever, the nose of said pawl subsequent to the disengagement of the detent from the ratchet wheel being adapted to rest on the peripheral edge of said disc and thereby to maintain the detent out of engagement with the ratchet wheel and means for connecting the rotatable disc to the weighing mechanism, whereby any change of load when the detent is disengaged effects through the said disc a displacement of the pawl with the consequential return of the detent into its locking position.

3. A coin freed weighing apparatus comprising a weighing platform, a lever system supporting said platform, a weighing resistant mechanism, means for connecting said lever system to the weighing resistant mechanism, a rotatable weight indicator, means for effecting a rotation of said indicator, a lost motion linkage connecting said resistant to said last mentioned means, a one-way ratchet wheel rotatable with but fixed relatively to said indicator, a coin slot, a coin receiving receptacle, a coin chute for directing coins inserted in said slot to the receiving receptacle, a trip lever, a detent carried at one end of said trip lever and adapted to co-operate with said ratchet wheel for normally preventing the rotation of said indicator, a projection in the other end of said trip lever, said projection being disposed within the coin chute whereby it may be struck by a falling coin and caused to rock the trip lever for freeing the detent from the ratchet wheel, a rotatable disc having a smooth peripheral edge, a pawl depending from and pivotally connected to said trip lever, the nose of said pawl resting on the periphery of the disc and maintaining the detent out of engagement with the ratchet subsequent to the initial disengagement of the detent from the said wheel consequent upon an inserted coin striking the projection on the trip lever, and a crank rod connecting the disc with the means for connecting the weighing resistant mechanism to the lever system whereby any change of load on the weighing platform subsequent to the disengagement of the detent effects a rotation of the disc and a consequential displacement of the pawl and a return of the detent to its locking position.

4. A coin freed weighing apparatus comprising a load supporting means, weight indicating mechanism connected with said load supporting means, a rotatable weight indicator forming part of said mechanism, a ratchet wheel rotatable with but fixed relatively to said indicator a coin operated lever adapted to co-operate with said ratchet wheel for normally locking the aforesaid indicator, means for directing a coin to operate said lever for disengaging the lever from the ratchet wheel, a rotatable disc, a pawl depending from said lever, the nose of said pawl subsequent to the disengagement of said lever from the ratchet wheel, being adapted to rest on the peripheral edge of said disc, and thereby to maintain the lever out of engagement with the ratchet wheel, and means for connecting the rotatable disc to the weighing mechanism whereby any change of load when the lever is disengaged effects through the said disc a displacement of the pawl with consequential return of the lever into its locking position.

In testimony whereof I have signed my name to this specification.

LESLIE CLIFFORD BRADLEY.